United States Patent
Ippoliti et al.

(10) Patent No.: US 12,522,181 B2
(45) Date of Patent: Jan. 13, 2026

(54) ARRANGEMENT OF A SEPARATE FUNCTIONAL ELEMENT OF A WASHER WATER RESERVOIR ON A FIXING PORTION OF A STRUCTURAL COMPONENT

(71) Applicant: VOLKSWAGEN AKTIENGESELLSCHAFT, Wolfsburg (DE)

(72) Inventors: Mario Ippoliti, Wolfsburg (DE); Thorsten Tobias Merz, Lehre (DE); Stefan Krüger, Klötze (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 676 days.

(21) Appl. No.: 17/297,054

(22) PCT Filed: Nov. 7, 2019

(86) PCT No.: PCT/EP2019/080617
§ 371 (c)(1),
(2) Date: May 26, 2021

(87) PCT Pub. No.: WO2020/108949
PCT Pub. Date: Jun. 4, 2020

(65) Prior Publication Data
US 2022/0024419 A1   Jan. 27, 2022

(30) Foreign Application Priority Data
Nov. 26, 2018 (DE) .................... 10 2018 220 292.3

(51) Int. Cl.
*B60S 1/50* (2006.01)
*B62D 25/12* (2006.01)
*F16B 5/00* (2006.01)

(52) U.S. Cl.
CPC ............... *B60S 1/50* (2013.01); *B62D 25/12* (2013.01); *F16B 5/0036* (2013.01)

(58) Field of Classification Search
CPC ... B60R 2011/0073; B60S 1/50; B62D 25/12; F16B 5/0036; F16B 5/0664
See application file for complete search history.

(56) References Cited

U.S. PATENT DOCUMENTS 3,271,059 A * 9/1966 Pearson ................ F16B 5/0664
24/453
3,858,988 A * 1/1975 Cohen ....................... F16B 7/22
403/18

(Continued)

FOREIGN PATENT DOCUMENTS

CN    202783115 U    3/2013
CN    205793829 U    12/2016

(Continued)

OTHER PUBLICATIONS

International Search Report of PCT Application No. PCT/EP2019/080617, mailed Jan. 28, 2020.

*Primary Examiner* — Matthew R McMahon
(74) *Attorney, Agent, or Firm* — PEARL COHEN ZEDEK LATZER BARATZ LLP

(57) ABSTRACT

An arrangement of a separate functional element of a washing fluid reservoir on a corresponding a fixing portion of a structural component of a motor vehicle, wherein the fixing portion is at least partially formed from a plastics material, and wherein an opening is formed in the fixing portion in such a manner that an insertion portion of the functional element can be brought into a final installation position by insertion and sliding and/or rotation in a direction transverse to the depth direction of the opening, wherein, in the final installation position, the functional (Continued)

element is positively fixed in relation to the structural component, as viewed in the depth direction of the opening.

7 Claims, 5 Drawing Sheets

(56) References Cited

U.S. PATENT DOCUMENTS

| | | | |
|---|---|---|---|
| 4,346,865 A | 8/1982 | Murata | |
| 5,529,271 A * | 6/1996 | Dunchock | B60R 11/0241 248/205.2 |
| 6,026,974 A | 2/2000 | Burt | |
| 6,250,493 B1 * | 6/2001 | Kwan | A47J 45/071 220/759 |
| 6,612,078 B2 * | 9/2003 | Hawang | A47B 47/042 52/36.5 |
| 6,705,635 B2 * | 3/2004 | Hoeft | B60R 21/20 280/730.2 |
| 7,975,874 B2 * | 7/2011 | Scott | A47J 45/071 220/573.1 |
| 8,109,560 B2 | 2/2012 | Joly-Pottuz et al. | |
| 8,336,953 B2 * | 12/2012 | Greb | F04D 29/601 180/68.5 |
| 8,511,954 B2 * | 8/2013 | Fink | F16B 21/09 411/104 |
| 9,526,375 B2 * | 12/2016 | Chang | A47J 37/0713 |
| 10,543,500 B2 | 1/2020 | Nilsson et al. | |
| 11,576,530 B2 * | 2/2023 | Bonaccorso | A47J 37/0641 |
| 2011/0049321 A1 * | 3/2011 | Wu | F16M 11/045 248/339 |

FOREIGN PATENT DOCUMENTS

| | | | | |
|---|---|---|---|---|
| CN | 206344792 U | * | 7/2017 | |
| CN | 206938871 U | | 1/2018 | |
| CN | 107847080 A | | 3/2018 | |
| CN | 108289572 A | | 7/2018 | |
| DE | 1980063 U | | 2/1968 | |
| DE | 3008323 A1 | | 9/1980 | |
| DE | 4142023 C2 | | 6/1993 | |
| DE | 4322916 A1 | | 1/1995 | |
| DE | 19502999 A1 | | 8/1995 | |
| DE | 19841021 A1 | | 5/1999 | |
| DE | 10023403 A1 | * | 11/2001 | B60R 21/06 |
| DE | 10 2004 034 733 A1 | | 2/2006 | |
| DE | 102012014712 A1 | * | 1/2014 | B62D 25/163 |
| DE | 10 2012 020 397 A1 | | 4/2014 | |
| DE | 10 2013 211 296 A1 | | 12/2014 | |
| DE | 102015209348 A1 | * | 11/2016 | B62D 25/082 |
| EP | 2213886 A2 | | 8/2010 | |
| EP | 3323679 A1 | * | 5/2018 | |
| FR | 2900991 A1 | | 11/2007 | |
| JP | H07217604 U | | 8/1995 | |
| JP | H07232620 A | | 9/1995 | |
| JP | 2008-68717 A | | 3/2008 | |
| JP | 2012116274 A | * | 6/2012 | |
| WO | WO-2009080916 A1 | * | 7/2009 | B60R 11/02 |

* cited by examiner

ARRANGEMENT OF A SEPARATE FUNCTIONAL ELEMENT OF A WASHER WATER RESERVOIR ON A FIXING PORTION OF A STRUCTURAL COMPONENT

CROSS-REFERENCE TO RELATED APPLICATIONS

This application is a National Phase Application of PCT International Application No. PCT/EP2019/080617, International Filing Date Nov. 7, 2019, claiming priority of German Patent Application No. 10 2018 220 292.3, filed Nov. 26, 2018, which is hereby incorporated by reference.

FIELD OF THE INVENTION

The invention relates to an arrangement of a separate functional element of a washing fluid reservoir on a fixing portion of a structural component, and in particular the arrangement of a filler neck of a washing fluid reservoir on a fixing portion of a motor vehicle hood latch support. The invention also relates to a motor vehicle having such an arrangement, a filler neck for a washing fluid reservoir, and a motor vehicle hood latch support having a fixing portion. The invention also relates to a method for installing a functional element of a washing fluid reservoir on a fixing portion of a structural component, in particular a filler neck of a washing fluid reservoir on a motor vehicle hood latch support.

BACKGROUND OF THE INVENTION

The invention is based on the object of providing an arrangement of a functional element of a washing fluid reservoir on a fixing portion of a structural component, a motor vehicle having such an arrangement, a filler neck for a washing fluid reservoir, a motor vehicle hood latch support, and a method for installation, all of these allowing simple installation.

SUMMARY OF THE INVENTION

The object is achieved according to the invention with the features of the independent claims. Further practical embodiments and advantages of the invention are described in connection with the dependent claims.

The invention relates to the arrangement of a separate functional element of a washing fluid reservoir on a corresponding fixing portion of a structural component of a motor vehicle. The separate functional element is, in particular, a filler neck for the washing fluid reservoir. The functional element preferably has an attachment portion which comes into contact with the fixing portion. The functional element is made in particular of a plastics material, and preferably of polypropylene (PP).

The structural component is arranged in particular in a front end of a motor vehicle, and extends over a large part of the width of the front end. The structural component preferably extends over at least 900 mm in the transverse direction of the vehicle (the y direction) and particularly preferably forms a connection between two longitudinal members. In this respect, the structural component functions to improve the rigidity in the front end. The structural component extends in the longitudinal direction of the vehicle (the x direction) over a minimum of 150 mm and a maximum of 400 mm. The structural component is preferably a hood latch support for a motor vehicle. In addition to the arrangement of the functional element, the hood latch support is used in particular to arrange a hood latch system and/or a front apron.

The fixing portion is arranged on the structural component outside a region which is subject to requirements with regard to pedestrian protection. In particular, the fixing portion, viewed in the longitudinal direction of the vehicle (the x direction), is arranged on the side of the structural component facing away from the front end of a motor vehicle, and, in an arrangement in a front vehicle, at least 150 mm in the longitudinal direction of the vehicle (the x direction) behind the rear edge of a bumper cross member. Viewed in the transverse direction of the vehicle (the y direction), the fixing portion is arranged off-center of the structural component, and is easily accessible. The fixing portion is arranged in particular in the vertical direction of the vehicle (the z direction) at a height of 200 mm to 350 mm above the bumper cross member. The width of the fixing portion is in particular between 5 mm and 40 mm, and preferably between 10 mm and 20 mm.

The fixing portion is at least partially made of a plastics material. In particular, the fixing portion is formed only from a plastics material or, alternatively, from a hybrid structure, such as glass fiber reinforced plastic. PP-GF30, for example, is suitable in this case. A structural component having such a fixing portion, which is at least partially formed from a plastics material, has particular advantages in terms of weight. Plastic has a relatively low weight, and structural components having such a fixing portion are therefore particularly suitable for use in vehicles with electric drives. The entire structural component is advantageously made at least partially from a plastics material, and is accordingly particularly light. A glass fiber reinforcement or a metal insert can be used for additional stability of the structural component. Such a structural component can also be produced inexpensively by means of, inter alia, injection molding.

An opening is formed in the fixing portion such that an insertion portion of the functional element can be brought into a final installation position by inserting and sliding in a direction transverse to the depth direction of the opening and/or rotating in a direction transverse to the depth direction of the opening, the functional element in the final installation position being fixed positively with respect to the structural component as seen in the depth direction of the opening. The above, and/or above combination, is to be understood in such a way that the insertion is mandatory, and then either a sliding or a rotation, or a sliding and a rotation follows. The sequence of the sliding and rotating is irrelevant in the latter case; also, an obligatory, repeated switching between sliding and rotating should not be excluded.

The arrangement according to the invention enables a particularly simple installation of the functional element on the structural component, since only two movements are required (namely insertion and sliding and/or insertion and rotation) in order to realize a positive fixation on the structural component in the depth direction of the opening of the functional element. Additional fastening elements and/or support elements, such as screws, or receptacles or adapters arranged on the structural component, can accordingly be dispensed with. The arrangement according to the invention can accordingly also be produced particularly inexpensively.

In a practical embodiment of the arrangement according to the invention, the insertion portion and the fixing portion are designed in such a way that the insertion portion in the final installation position is arranged to protrude through the opening in such a way that the insertion portion engages behind a clamping portion of the fixing portion, and this engagement from behind realizes a non-positive fixation between the insertion portion and the fixing portion. The engagement from behind in the final installation position can be produced particularly easily if the opening is a keyhole-shaped opening and the insertion portion is mushroom-shaped or hook-shaped. In particular, by means of the insertion portion engaging behind the clamping portion, a clamping fixation of the functional element on the structural component is realized, which is particularly stable against forces acting in a front end of a motor vehicle while driving.

The fixation of the functional element on the structural component is further improved if a resilient locking tab is provided on the functional element, which in the final installation position produces a positive fixation of the functional element with respect to the structural component in such a way that it cannot slide back and/or rotate back out of the final installation position due to being locked positively. Such a cooperation of the locking tab with the structural component reduces the risk that the functional element will inadvertently become detached from the structural component. In the final installation position, the resilient locking tab is arranged in particular in such a way that the locking tab rests against the inside of the opening. In particular, the resilient locking tab is provided for this purpose on the insertion portion which extends through the opening. In addition, an actuating portion is preferably provided on the locking tab, by means of which the locking tab can be moved from the position fixed in the final installation position into a compressed position in which the insertion portion can then be slid back and/or rotated back in the opening to reverse the arrangement.

In particular, the functional element has at least one support rib extending vertically. In the final installation position, the support rib serves to support the weight force acting on the functional element. For this purpose, the support rib engages in particular in a depression in the fixing portion and is in particular fixed in a clamping manner; the support rib and a transverse rib formed on the functional element rest on opposite surfaces of a wall of the recess. The support rib has an engaging portion which, in the final installation position, is arranged so as to engage in a recess in the fixing portion of the structural component, thereby constituting an anti-rotation device.

In a further practical embodiment, the functional element has at least one transverse rib which is arranged in the final installation position in such a way that the functional element is supported with the transverse rib on the structural component. In particular, the functional element has a plurality of transverse ribs, and in particular one transverse rib which protrudes relative to the other transverse ribs and is arranged in a depression in the fixing portion. The ends of the transverse ribs rest against the wall surfaces of the depression, and the interaction of the transverse rib and the recess represents an additional safeguard against rotation of the functional element on the fixing portion.

The at least one transverse rib formed on the functional element interacts particularly advantageously with at least one longitudinal rib provided on the structural component in the fixing portion. A plurality of longitudinal ribs on the fixing portion and transverse ribs on the functional element are preferably provided in such a way that a lattice structure results, which can be referred to as a contact surface or a contact lattice. Such a contact lattice is robust against impacting forces, and a small amount of material is required to produce it. In addition, longitudinal ribs and transverse ribs can be easily produced by injection molding.

The invention also relates to a motor vehicle having an arrangement as described above, wherein the fixing portion in the installation position extends at an angle to the vertical direction of the vehicle (the z direction), and the insertion portion is designed in such a way that an at least partially downward movement, in the vertical direction of the vehicle (the z direction), is necessary for the installation of the functional element. In particular, an attachment portion corresponding to the fixing portion, running obliquely to the vertical direction of the vehicle (the z direction), is also formed on the functional component. This inclined design of the fixing portion, and optionally of the corresponding attachment portion, has several advantages: on the one hand, such a fixing portion, which is inclined relative to the vertical direction of the vehicle (the z direction), and has an opening in only one direction, can be removed from the mold without the use of slides. The removal from the mold takes place in the vertical direction of the vehicle. Furthermore, an inclined fixing portion or attachment portion allows for a simple installation, carried out by a partially downward sliding movement, and the installation and retention in the final installation position are additionally supported by the action of gravity.

The invention also relates to a filler neck for a washing fluid reservoir of a motor vehicle. The filler neck has a base body; an attachment portion with a hook-shaped insertion portion, and also a resilient locking tab, are configured on the base body. In particular, the attachment portion additionally has a support rib with an engaging portion which is formed at a distance from the insertion portion. A combination of the above-mentioned fastening means (insertion portion, locking tab, support rib), which extend over the height of the attachment portion, enables a stable connection or fixation of the filler neck to a fixing portion provided for this purpose, which is particularly robust against potential shocks in a motor vehicle. Furthermore, these fastening means enable simple installation with just a few movements, and without additional separate fastening elements. The fastening means can also be produced by means of injection molding. In particular, the filler neck with the base body and the attachment portion is produced in one piece from a plastics material in an injection molding process.

The invention also relates to a motor vehicle hood latch support having a fixing portion which has an opening for receiving a functional element of a washing fluid reservoir, the fixing portion being at least partially, in particular completely, made of a plastics material or a glass fiber reinforced plastic. In particular, the entire motor vehicle hood latch support is formed from a plastics material, a glass fiber reinforced plastic, or from a plastics material with a metal insert. For the advantages thereof and other features, reference is made to the description above. The fixing portion has in particular at least one of the fixing means already described above, such as, for example, an opening, a clamping portion, a depression or a recess.

The invention also relates to a method for installing a functional element of a washing fluid reservoir on a fixing portion of a structural component of a motor vehicle, the fixing portion being at least partially made of a plastics material, and an opening being formed in the fixing portion. An insertion portion of the functional element is inserted into the opening to reach a final installation position, and is then slid and/or rotated in a direction transverse to the depth direction of the opening. In the final installation position, the functional element is then positively fixed with respect to the structural component, as viewed in the depth direction of the opening. As already described above, the installation of the functional element on the washing fluid reservoir can be carried out particularly easily and in particular without additional fastening elements.

In order to achieve further support and/or securing of the arrangement of the functional element on the fixing portion, a resilient locking tab can also be arranged during the production of the final installation position in such a way that it counteracts a backward movement or a backward rotation of the insertion portion out of the opening. By means of an actuating portion provided on the locking tab, the locking tab can be actuated, and in particular compressed, in such a way that the arrangement can be released.

BRIEF DESCRIPTION OF THE DRAWINGS

Further practical embodiments of the invention are described below in connection with the drawings. In the drawings.

DETAILED DESCRIPTION OF THE INVENTION

Figure 1:
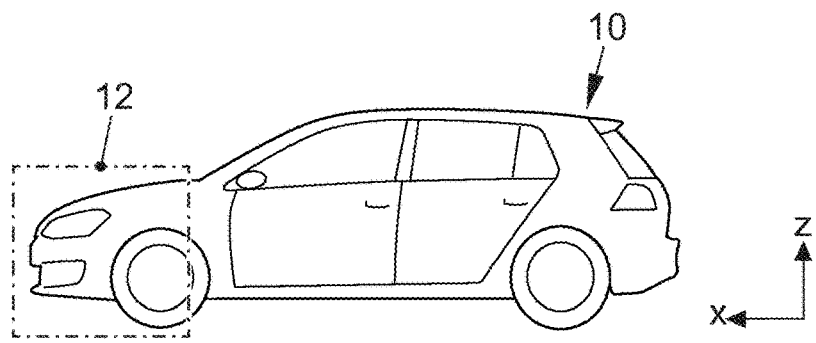
FIG. 1 shows a motor vehicle in a side view.

In FIG. 1, a motor vehicle 10 is shown in a side view. An arrangement according to the invention is implemented in the front end 12 of the motor vehicle 10, which is indicated by dashed lines in FIG. 1.

Figure 2:
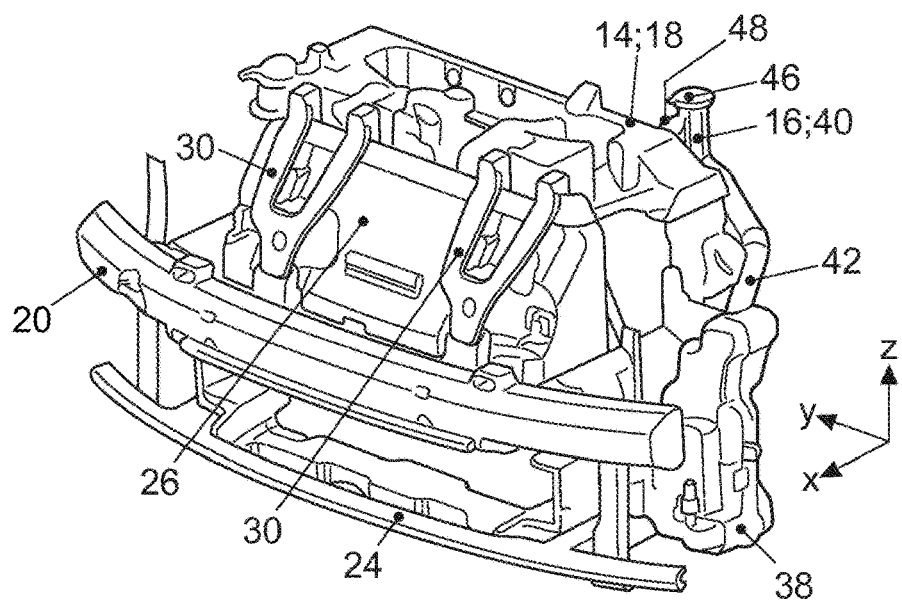
FIG. 2 is an arrangement according to the invention in a front end of a motor vehicle, in a final installation position, in a perspective view obliquely from the front.
Figure 3:
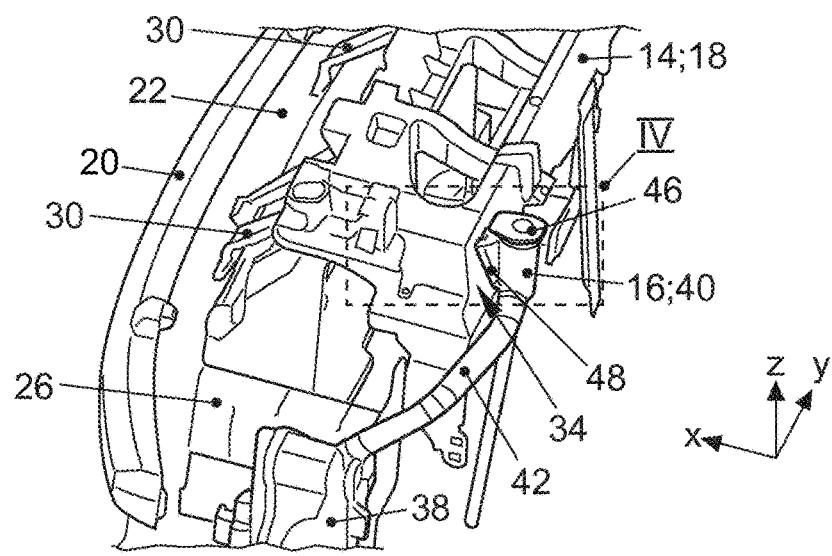
FIG. 3 is the arrangement of FIG. 2, in a perspective view obliquely from behind.

In FIGS. 2 and 3, an embodiment of the arrangement according to the invention, with a functional element 16 and a structural component 14, is shown in detail in the front vehicle 12, wherein the car body shell elements (bumper cladding, radiator grille, hood, etc.) arranged in front of the structural component 14 in the vehicle longitudinal direction are not shown in this case.

In the embodiment, the structural component 14 is a motor vehicle hood latch support 18 which—viewed in the vehicle longitudinal direction (the x direction)—is arranged behind a bumper cross member 20 with a foam part 22, a pedestrian protection cross member 24 arranged underneath it in the vehicle vertical direction (the z direction), and an air guiding element 26. The structural component 14 extends in the present case in the vehicle transverse direction (the y direction) between two longitudinal members (not shown).

Openings serving as bolt holes 28 are provided in the structural component 14 (see FIG. 7), which serve for—indirectly or directly—fastening the structural component 14 to the longitudinal members. In the recess 78 that can be seen in FIG. 6, there are one or more further bolt holes that cannot be seen. As can be clearly seen in FIG. 2, the structural component 14 is used in the present case, among other things, for fastening two lock supports 30.

Figure 6:
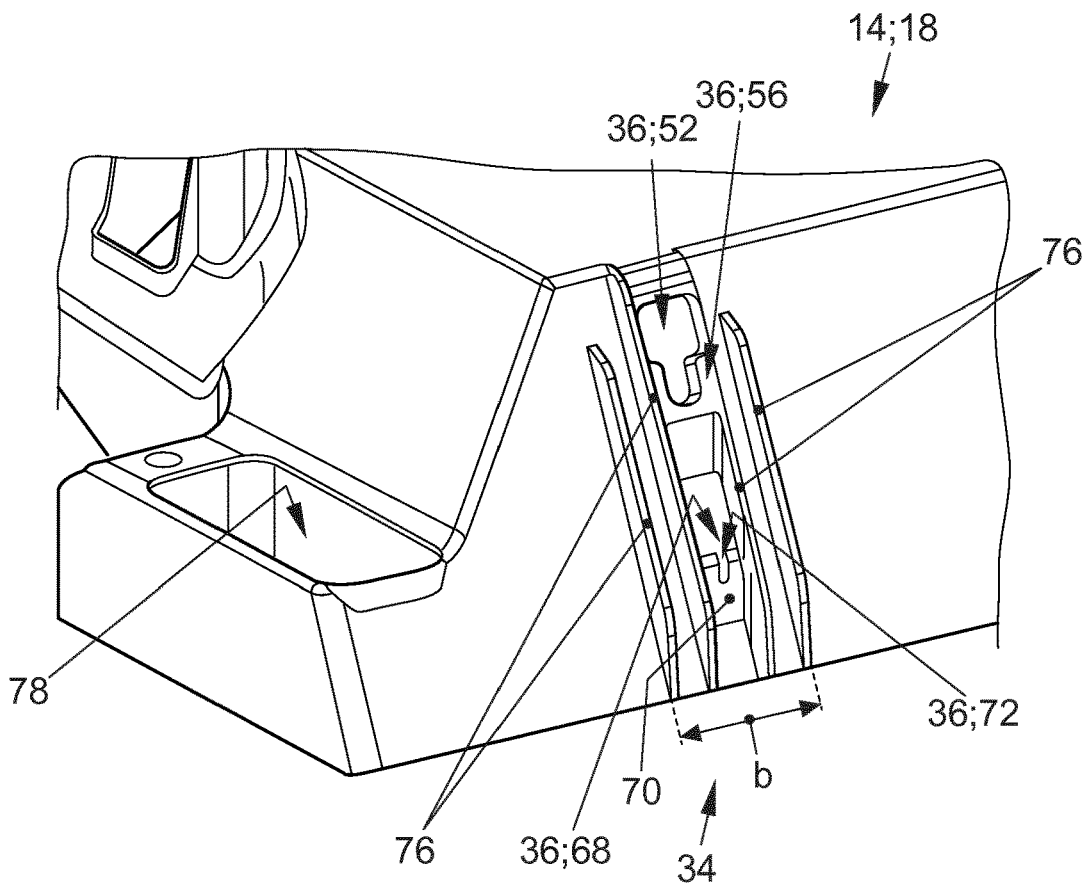
FIG. 6 is a first embodiment of a motor vehicle hood latch support according to the invention, in a perspective view from the side.
Figure 7:
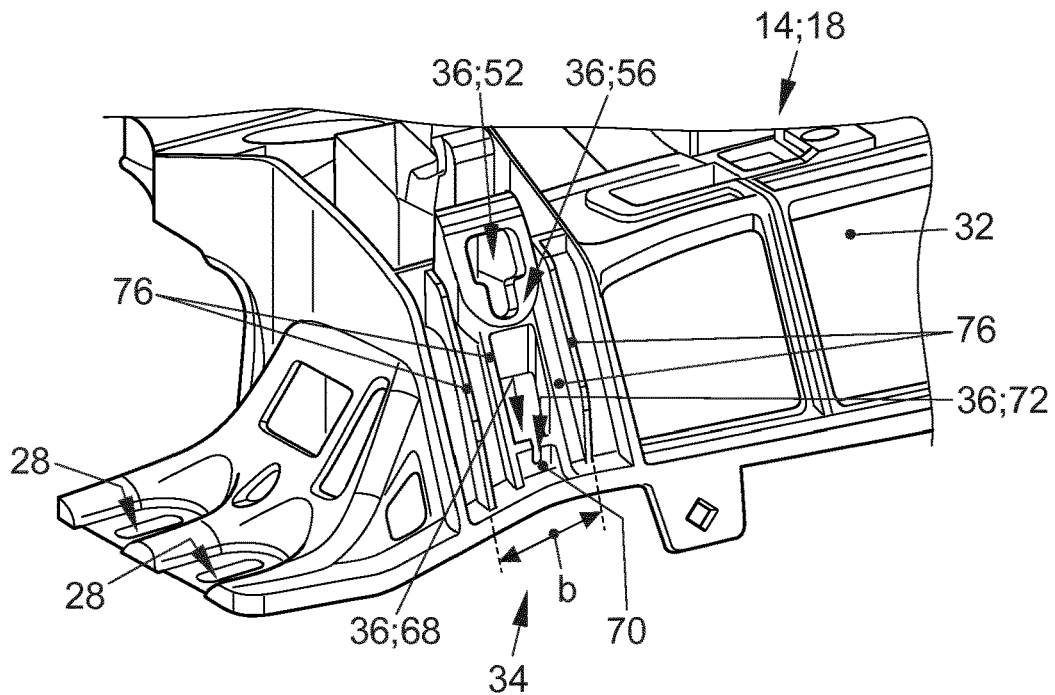
FIG. 7 is a second embodiment of a motor vehicle hood latch support according to the invention, in a perspective view from the side.

The structural component 14 is shown separately in FIGS. 6 and 7 in different embodiments. In the first embodiment shown in FIG. 6, the structural component 14 is made only from glass fiber reinforced plastic.

The second embodiment in FIG. 7 is made of a plastics material and has a metal insert 32. The two embodiments are the same insofar as they have a fixing portion 34 made of a plastics material with the same fixing means 36, and an identical functional element 16 is correspondingly provided on both.

As can be clearly seen in FIGS. 2 to 5, the fixing portion 34 is arranged on the side of the structural component 14 facing away from the vehicle front. The fixing portion 34 is arranged on the structural component 14 in an off-center, easily accessible region as viewed in the transverse direction of the vehicle (the y direction)—in the present case, on the right-hand side of the structural component 14 as viewed in the direction of travel. The width b of the fixing portion 34 is 15 mm in this case.

In addition, a washing fluid reservoir 38 having a filler neck 40, and a tube 42 connecting the filler neck 40 and the washing fluid reservoir 38, are arranged in the front vehicle 12. The filler neck 40 is fixed to the fixing portion 34 of the structural component 14 in the final installation position shown in FIGS. 2 to 5, and in this respect serves as a functional element 16.

Figure 8:
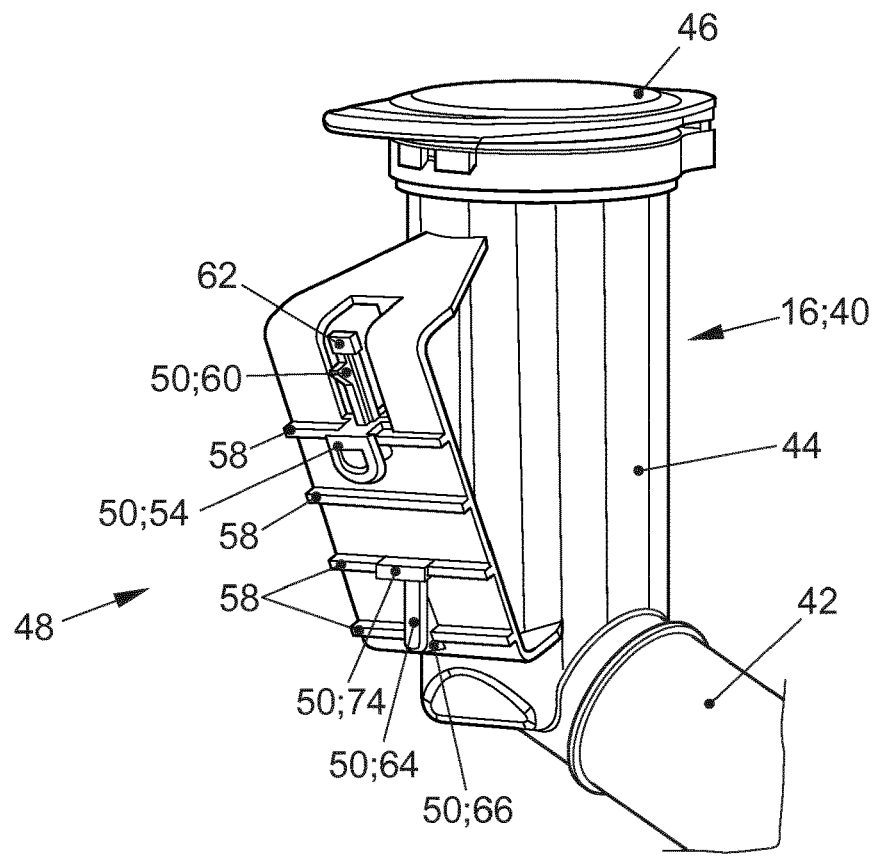
FIG. 8 is a filler neck according to the invention, in a perspective view from the side.
Figure 9:
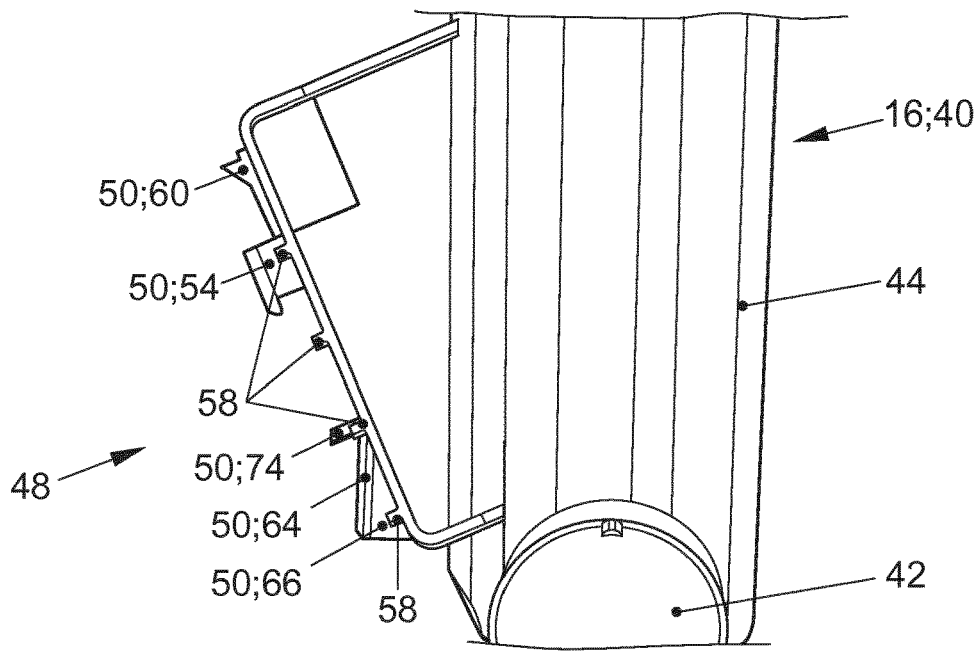
FIG. 9 is the filler neck from FIG. 8, in a side view.

In FIGS. 8 and 9, the filler neck 40 is shown in detail. The filler neck 40 comprises a base body 44 which is used for pouring in washing fluid, and which is closed with a cover 46. In the present case, the cover 46 and the base body 44 are clipped together. An attachment portion 48 with a plurality of fastening means 50, by means of which the filler neck 40 is fastened in the fixing portion 34 to the structural element 14, also extends from the base body 44.

In the following, in connection with FIGS. 4 to 9, the arrangement of the functional element 16 on the structural component 14 is explained in detail.

A keyhole-shaped opening 52 is formed in the fixing portion 34 (see FIGS. 6 and 7). Corresponding to this, a hook-shaped or mushroom-shaped insertion portion 54 is formed on the attachment portion 48 of the functional element 16 (see FIGS. 8 and 9). The insertion portion 54 is inserted through the opening 52 and is then arranged by being displaced in a direction transverse to the depth direction of the opening 52—in this case, downwards in the vertical direction of the vehicle (the z direction)—in such a way that it engages behind a clamping portion 56 formed on the fixing portion 34 (see FIG. 5). Correspondingly, a positive fixation of the functional element 16 on the structural component 14 is produced in a depth direction of the opening 52. In addition, clamping is generated by the part of the insertion portion 54 engaging behind the clamping portion 56, and a transverse rib 58 resting against the clamping portion 56 (see FIG. 5).

Figure 4:
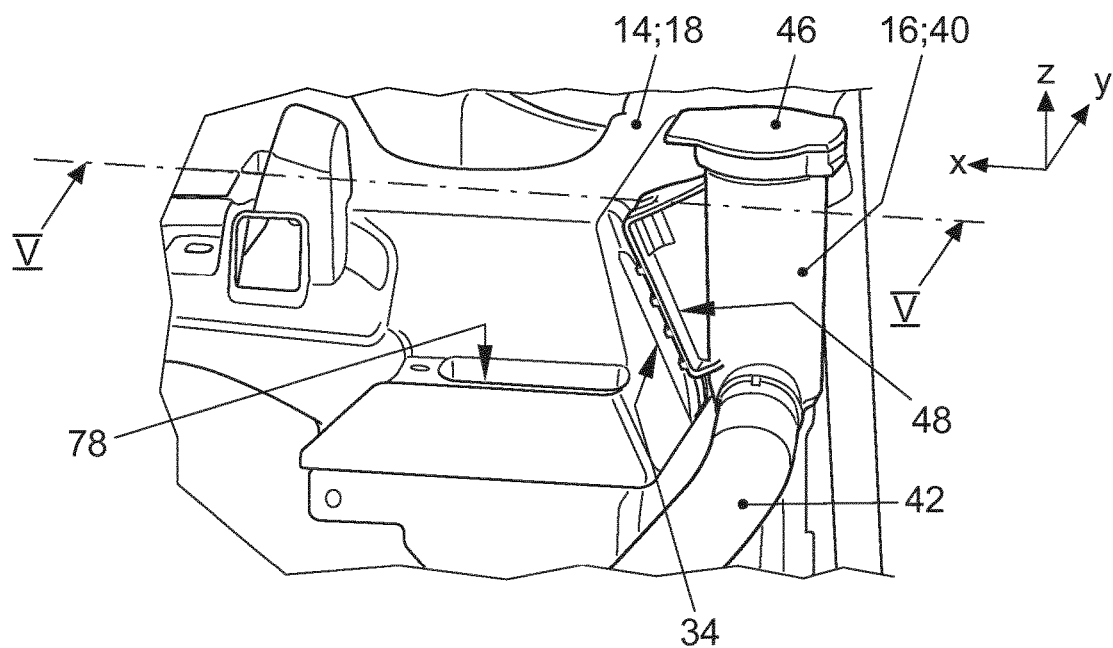
FIG. 4 is the region marked IV of FIG. 3, in an enlarged illustration.
Figure 5:
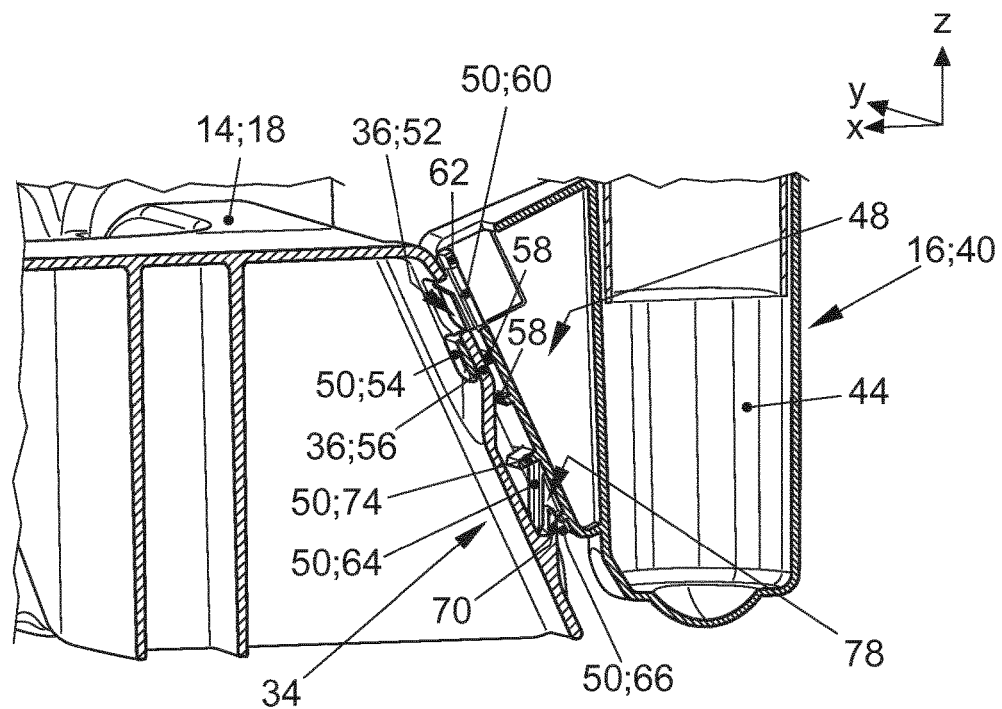
FIG. 5 is the arrangement of FIG. 4, in a sectional view along line V-V in FIG. 4.

A resilient locking tab 60 is formed on the insertion portion 54 and is arranged in a final installation position, shown in detail in FIGS. 4 and 5, against the inside of the opening 52. The locking tab 60 prevents the insertion portion 54 from sliding back upwards in the vertical direction of the vehicle (the z direction). An actuating portion 62 is arranged on the locking tab 60, by means of which the resilient locking tab 60 can be moved out of the opening 52, thus enabling the functional element 16 to be moved back and also to be uninstalled from the fixing portion 34.

To improve the fixation of the arrangement, the functional element 16 has, in the attachment portion 48, a support rib 64 which extends in this case in the vertical direction of the vehicle (the z direction) and has an engaging portion 66 (see FIGS. 8 and 9). The support rib 64 is supported in a depression 68 formed on the fixing portion 34. Here, too, a clamping fixation can optionally be achieved by the support rib 64 and a transverse rib 58, which rest on opposite surfaces of a wall 70 of the depression 68. In addition, in the final installation position, the engaging portion 66 engages in a recess 72 formed on the fixing portion 34 in the wall 70 (see FIG. 5), thereby effecting a guide (in particular during installation) and an anti-rotation device (in particular during use).

As already mentioned above, the attachment portion 48 has a plurality of transverse ribs 58, one transverse rib 74 protruding from the other transverse ribs 58 in the present case. This transverse rib 74 comes to rest with its ends on the wall surfaces of the depression 68, and accordingly also acts as an anti-rotation device.

Adjacent to the opening 52, the structural component 14 has longitudinal ribs 76 running parallel to one another on the fixing portion 16, so that in the final installation position shown in FIGS. 2 to 5, a contact lattice results from the longitudinal ribs 76 and the transverse ribs 58 formed on the attachment portion 48.

Figure 10:
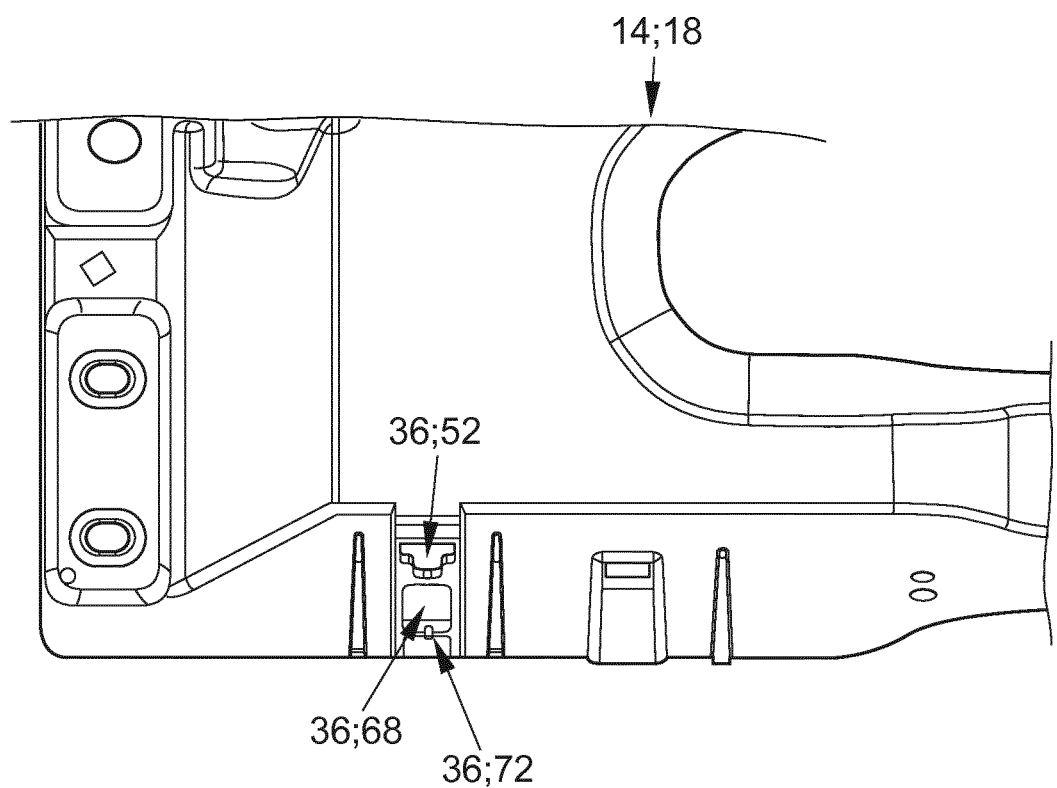
FIG. 10 is a detail of the motor vehicle hood latch support from FIG. 6, in plan view.
Figure 11:
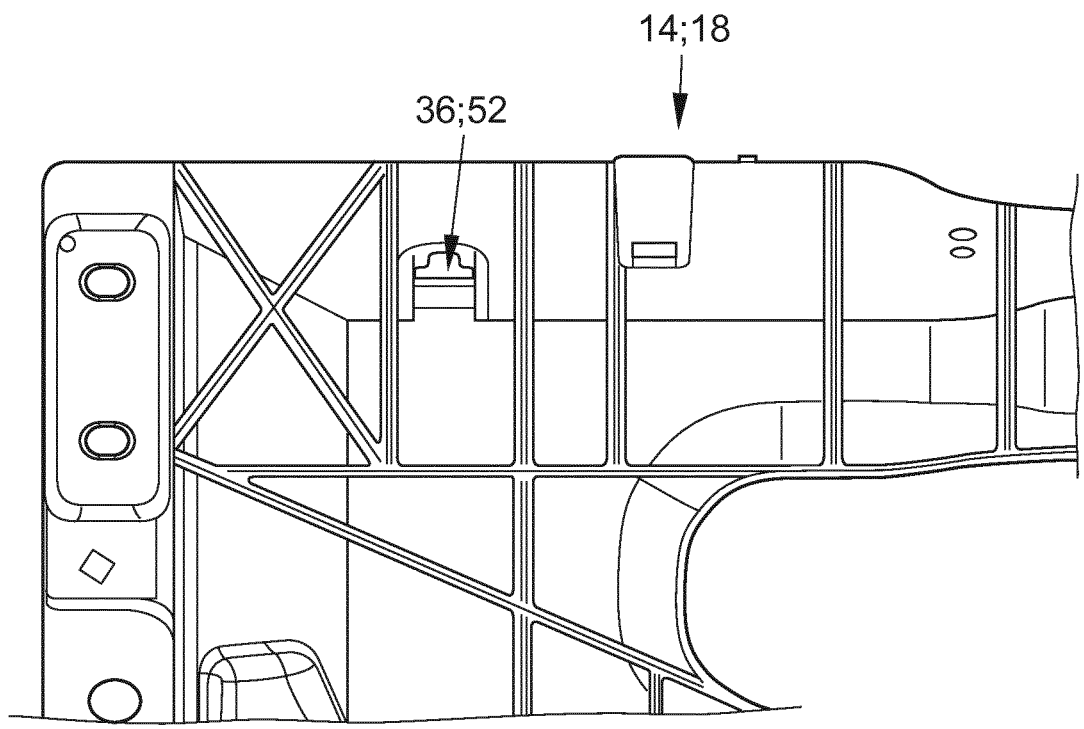
FIG. 11 is the detail of the motor vehicle hood latch support of FIG. 10, in a view from below.

As can be clearly seen in FIGS. 5 to 7, the fixing portion 34 extends on the structural component 14 at an angle to the vertical direction of the vehicle (the z direction). The structural component 14 can thus be removed from the mold in the vertical direction of the vehicle (the z direction). The structural component 14 is shown in FIGS. 10 and 11, once from the top and once from the bottom. It can be seen that the fixing portion 34 with the fixing means 36 and the entire structural component 18 can be removed from the mold in one direction out of the plane of the page (the z direction) without a slide.

The features of the invention disclosed in the present description, in the drawings, and in the claims can be substantial both individually and in any combination for the implementation of the invention in its various embodiments. The invention can be varied within the scope of the claims and taking into account the knowledge of a person skilled in the art.

LIST OF REFERENCE SIGNS

10 Motor vehicle
12 Front vehicle
16 Functional element
14 Structural component
18 Motor vehicle hood latch support
20 Bumper cross member
22 Foam part
24 Pedestrian protection cross member
26 Air guide element
28 Bolt holes
30 Latch support
32 Metal insert
34 Fixing portion
36 Fixing means
38 Washing fluid reservoir
40 Filler neck
42 Tube
44 Base body
46 Cover
48 Fastening portion
50 Fastening means
52 Opening
54 Insertion portion
56 Clamping portion
58 Cross rib
60 Locking tab
62 Actuating portion
64 Support rib
66 Engaging portion
68 Depression
70 Wall
72 Recess
74 Protruding cross rib
76 Longitudinal rib
78 Depression

The invention claimed is:

1. An arrangement of a separate functional element of a washing fluid reservoir on a fixing portion of a structural component of a motor vehicle, wherein:
   the functional element has side surfaces that extend substantially in a vertical direction of the motor vehicle;
   the structural component has a side surface that extends at an oblique angle relative to the vertical direction of the motor vehicle, and the fixing portion thereof has an installation surface that is substantially parallel to the side surface of the structural component and also extends at the oblique angle relative to the vertical direction of the motor vehicle;
   the functional element has an attachment member that extends from a side surface thereof at the oblique angle and that comprises an insertion portion;
   the fixing portion is at least partially made of a plastics material, and
   an opening is formed in the fixing portion in such a way that the attachment member of the functional element is configured to be brought into a final installation position by inserting and sliding and/or rotating the insertion portion in a direction transverse to the depth direction of the opening,
   wherein the functional element in the final installation position, viewed in the depth direction of the opening, is fixed positively with respect to the structural component; and
   further comprising a resilient locking tab on the attachment member of the functional element which, in the final installation position, causes the functional element to be positively fixed relative to the structural component in such a way that the functional element is blocked positively from sliding back and/or rotating back out of the final installation position.

2. The arrangement according to claim 1, wherein the insertion portion and the fixing portion are designed in such a way that the insertion portion in the final installation position is configured to protrude through the opening in such a way that the insertion portion engages behind a clamping portion of the fixing portion and, due to the engagement from behind, a positive fixation is realized between the insertion portion and the fixing portion.

3. The arrangement according to claim 1, wherein the attachment member of the functional element further comprises at least one support rib extending in a vertical direction, with an engaging portion which in the final installation position is configured to engage into a recess in the fixing portion of the structural component.

4. The arrangement according to claim 1, wherein the attachment member of the functional element has at least one transverse rib on an outer surface thereof which is arranged in the final installation position such that the functional element is supported on the structural component by the at least one transverse rib.

5. The arrangement according to claim 1, wherein the structural component has at least one longitudinal rib in the fixing portion.

6. The arrangement according to claim 1, wherein the functional element of the washing fluid reservoir is a filler neck.

7. A motor vehicle having an arrangement according to claim 1,
   wherein the fixing portion in the installation position extends at the oblique angle relative to the vertical direction of the vehicle, and
   wherein the insertion portion is designed in such a way that a downward movement at least partially in the vertical direction of the vehicle is necessary to install the functional element.

\* \* \* \* \*